March 20, 1973     L. P. LAZZARINI     3,721,145

SHUFFLE FEED POSITIONER AND CUTTER

Filed Jan. 21, 1971     2 Sheets-Sheet 1

INVENTOR.
LOUIS P. LAZZARINI

BY *Allen and Chromy*

ATTORNEYS

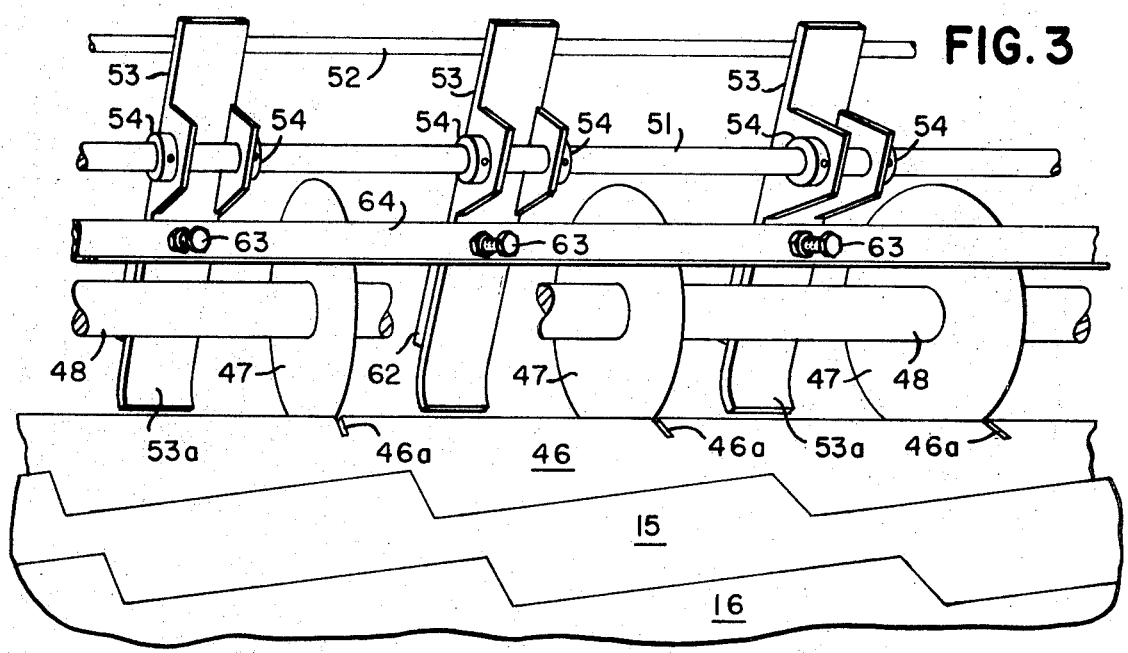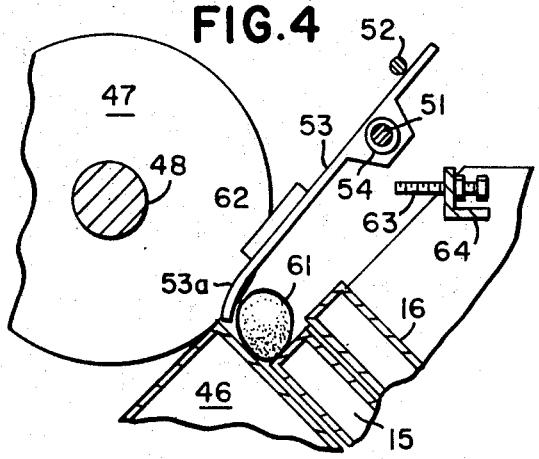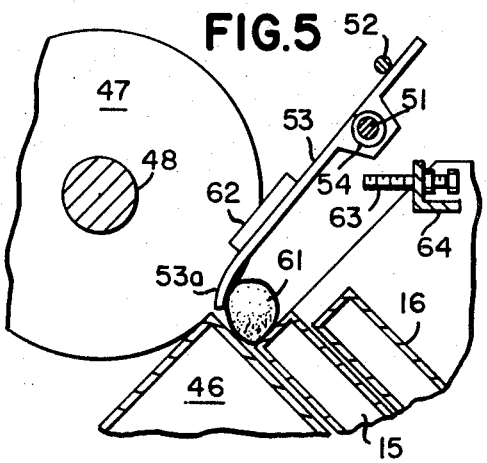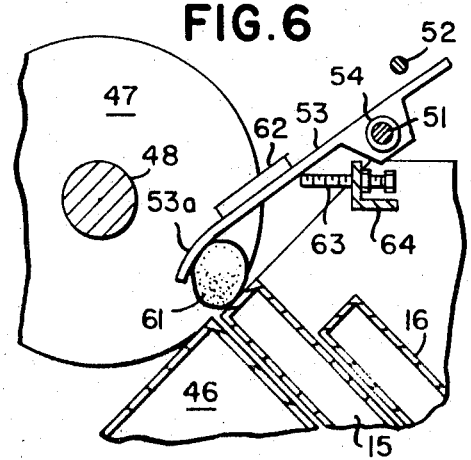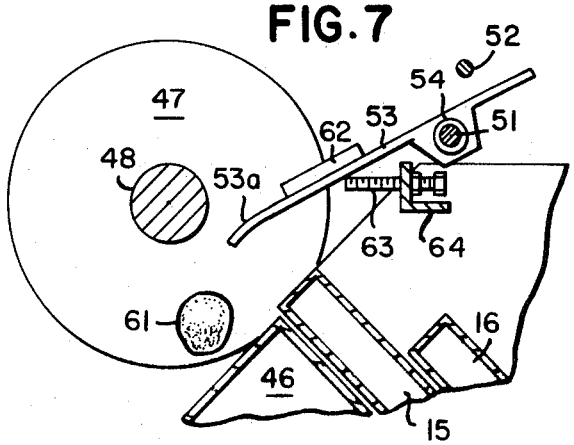

United States Patent Office 3,721,145
Patented Mar. 20, 1973

3,721,145
SHUFFLE FEED POSITIONER AND CUTTER
Louis P. Lazzarini, San Jose, Calif., assignor of a fractional part interest to Genevieve I. Hanscom, 225 Mt. Hermon Road, Lot 142, Santa Cruz, Calif., Genevieve I. Hanscom, Robert Magnuson, Lois J. Thomson, as trustees of the estate of Roy M. Magnuson
Filed Jan. 21, 1971, Ser. No. 108,311
Int. Cl. A23n 15/04
U.S. Cl. 83—732
7 Claims

ABSTRACT OF THE DISCLOSURE

A shuffle feed structure for feeding articles which require end trimming in which two shuffle feed mechanisms are placed in tandem so as to alternately feed an article in one direction by wedge-shaped surfaces on one shuffle feed mechanism and then feed the article in the other direction by oppositely facing wedge-shaped surfaces. At the time of carrying articles into cutting engagement with the knife, a holding means is provided for each article to yieldably hold it against any tendency to become displaced due to irregularity in its contour.

DESCRIPTION OF THE INVENTION

In the handling nd processing of certain elongated and irregularly shaped articles, such as sweet potatoes, it is desirable to orient these sweet potatoes and then to cut off their ends. The present invention has to do with an efficient feeding mechanism of a simple structure which will align the sweet potatoes properly and present them to the cutting knives referred to generally above.

It is a general object of the invention therefor to provide a shuffle feed structure having means for advancing and for slab cutting articles such as potatoes.

It is another object of the invention to provide a shuffle feed structure in which the cam-shaped pushing faces on the shuffle feed members are formed in two oppositely facing sections so as to move an article in opposite directions.

Another object of the invention is to provide means for yieldably holding an irregular article such as a sweet potato in position for cutting.

Other objects and advantages of the invention will be apparent from the following description of certain preferred embodiments thereof, as illustrated in the accompanying drawings, and in which:

FIG. 3 is a perspective view of a portion of one of the shuffle feed mechanisms and showing the sweet potato holding member in its idle position ready to be engaged by a sweet potato as fed by the shuffle feed members;

FIG. 4 is a schematic sectional view taken in the plane indicated by the line 4—4 in FIG. 2;

FIG. 5 is a sectional view similar to FIG. 4, but showing a different operative relation of the parts, the sweet potato in this case actually engages the holding member;

FIG. 6 is a view similar to FIGS. 4 and 5 showing the position of the parts as the sweet potato is moved into engagement with the cutting knife;

FIG. 7 is a similar view to FIG. 4 through 6, but showing the position of the parts after discharge of the potato after being trimmed by the cutting knife.

The shuffle feed mechanism as disclosed herein is described in detail in the application of Ralph K. Daugherty, Ser. No. 736,861, filed June 13, 1968, now Pat. No. 3,584,735, for Shuffle Feed Positioner, and reference is made to the Daugherty application of a disclosure of structures not disclosed in detail herein.

Figure 1:
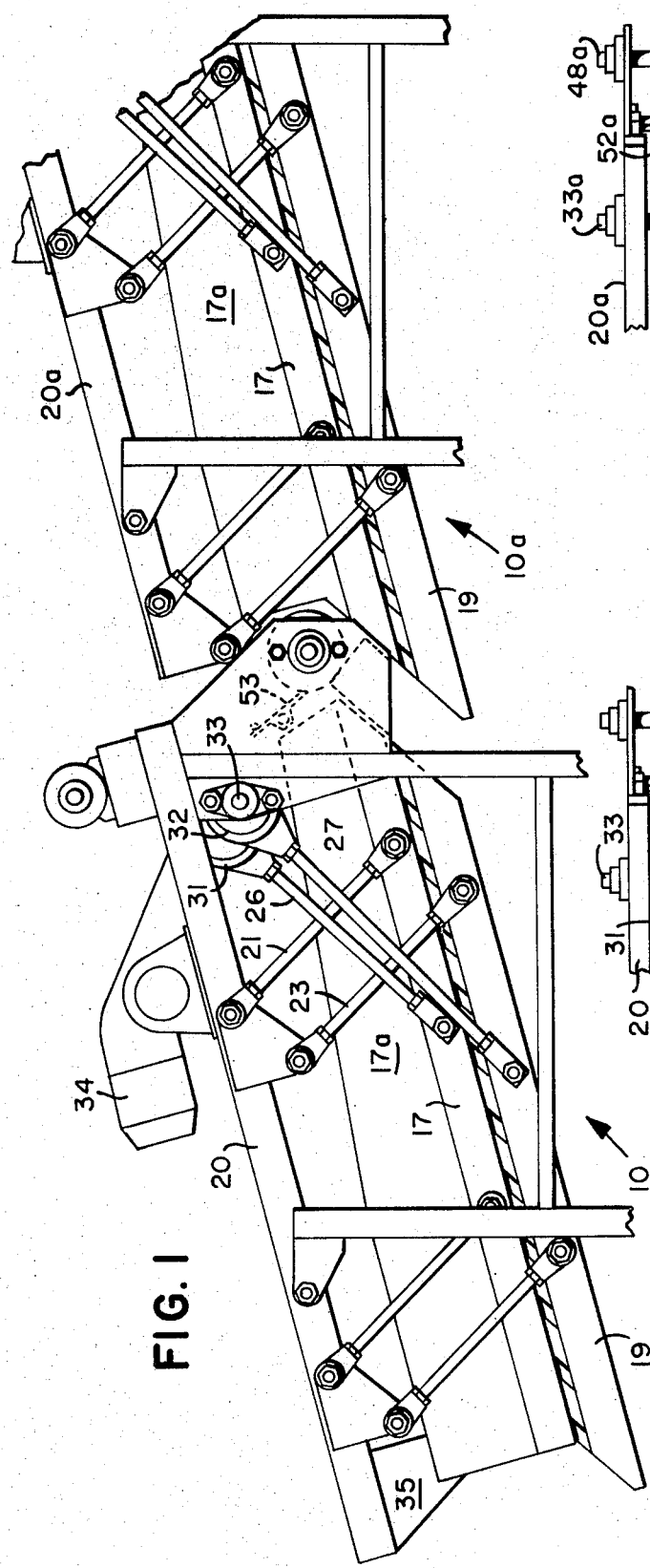
FIG. 1 is a side elevational view of a pair of shuffle feed mechanisms in tandem relation for carrying out the instant invention.
Figure 2:
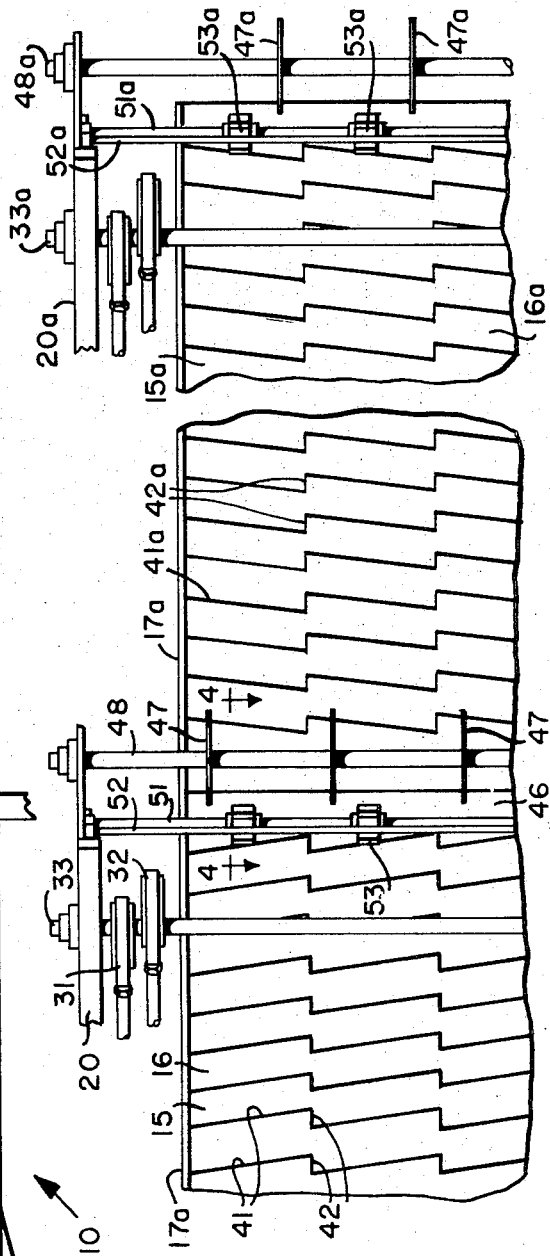
FIG. 2 is a fragmentary schematic plan view of the two shuffle feed mechanisms shown in FIG. 1.

Referring first to FIGS. 1 and 2 the shuffle feed structure of the instant invention includes a first shuffle feed mechanism 10, and a second shuffle feed mechanism 10a which has its feed end disposed underneath the discharge end of the first shuffle feed mechanism 10 so as to receive articles therefrom.

Each shuffle feeding mechanism comprises two similar movable sets of alternating shuffle members 15 and 16 (FIGS. 2 and 3) which are mounted in inclined position and a long upwardly facing article-supporting portion and a short upwardly facing article-advancing and supporting portion. The set of shuffle feed members 15 extends between and is secured to opposite frame members 17 carrying side walls 17a and the set of shuffle members 16 is carried by opposite shuffle frame members 19. The frame members 17 (FIGS. 1 and 2) are supported by two upwardly extending pivoted links 21 on each side which are pivotally supported on the adjacent frame member 20, and the frame members 19 and their corresponding shuffle members 16 are supported by respective parallel links 23 which are similarly supported in a pivoted fashion on frame member 20. It will be understood that in the usual fashion the shuffle members 15 and 16 of the respective sets of shuffle members are disposed alternately in the series of shuffle members shown, and as one set of shuffle members advances in feeding movement, the other shuffle member is being retracted.

The reciprocating drive for the respective shuffle feed members is obtained by drive links 26 and 27 (FIG. 1), there being one pair one pair on each side, the drive links 26 being pivotally connected to respective frames 17 and 19 at their lower ends and at the upper end to respective eccentric straps 31 and 32 on a suitable drive shaft 33 which is driven from a motor 34. The articles to be fed to the shuffle feed members, such as sweet potatoes, are conveyed thereto by a feed chute 35 of conventional construction.

This type of shuffle feed mechanism is disclosed in the patent to Magnuson No. 2,792,929 issued May 21, 1957. It will be understood, however, that the invention is equally applicable to a shuffle feed in which one set of shuffle feed members is stationary and the other set reciprocates with respect thereto.

Referring to FIG. 2, the advancing face of each shuffle feed member is composed of a series of wedge members each comprising a front advancing and camming face 41 terminating at its leading edge in a perpendicular stop face or abutment 42.

Referring to FIGS. 3 and 4 it will be seen that below the endmost shuffle feed member 15 of each set of shuffle feed mechanisms, there is disposed a stationary ramp 46 across which each sweet potato is pushed or rolled as it is fed to the knife and this ramp 46 is slotted or cut at 46a across its face adjacent each cut-off knife 47 to overlap the knife. The series of knives 47 are carried by a transverse drive shaft 48.

Each shuffle feed mechanism includes means associated with the shuffle feed members and the cut-off knives for yieldably holding an article in a position while it is being cut to avoid making an irregular or curved cut due to tipping of the article as the blade forces its way into the product. For this purpose a transverse shaft 51 (FIGS. 2, 3 and 4) extends between two opposite side portions of the frame and a second transverse rod or shaft 52 is similarly mounted. The upper rod 52 is a stop rod while the shaft 51 is a mounting shaft for a weight lever or member 53 which is held between two collars 54 suitably clamped to the cross shaft 51. The upper end of the lever 53 bears against the shaft 52 as a stop member which holds its lower curved end 53a spaced from the cooperating shuffle feed member 15. The lever member 53 provides yieldable means for holding the article to be cut such as a sweet potato 61 so that it will not tip and spoil the cut of the end surface and for this purpose is it preferably weighted by a weight 62. As the endmost shuffle member 15 feeds the sweet potato 61 into engagement with the lever member 53 as seen in FIG. 5, for example, at the same time a weight releasing means or abutment screw 63 for the lever 53 is advancing toward this lever. The abutment 63 is mounted on a cross angle 64 extending between side plates 17a. A lock nut 66 is provided for the abutment 63. The spacing is such that the weighted member 53 remains in engagement with the article 61 until the knife has passed through this article and then it is engaged and lifted by the abutment member or screw 63 to lift and free the article 61 for discharge.

Referring again to FIGS. 1 and 2, it will be seen that the two shuffle feed mechanisms 10 and 10a are placed in end-to-end tandem relation so that the discharge end of one of the first mechanisms 10 overlies the feed end of the second mechanism 10a. By reference to FIGS. 2, it will be seen that the wedge-shaped surfaces 41 and the stops 44 are inclined in one direction leading to the stops 42 and the wedge-shaped surfaces 41a of the second shuffle feed mechanism 10a are inclined in the opposite direction to oppositely facing stops 42a so that the knives are all set toward one end of the wedge for the mechanism 10 and toward the other end for the mechanism 10a. In this way the respective end portions of the sweet potato are cut off successively.

While I have shown and described a certain preferred embodiment of the invention it will be apparent that the invention is capable of variation and modification from the form shown so that the scope thereof should be limited only by the scope of the claims appended hereto.

I claim:

1. In a feed mechanism for orienting articles and then cutting such articles, a first shuffle feed mechanism, a second shuffle feed mechanism mounted in tandem with said first shuffle feed mechanism and adapted to receive articles therefrom, each of said shuffle feed mechanisms including a first set of transversely extending shuffle members, a second set of transversely extending shuffle members arranged in alternating relation with the shuffle members of said first set, each of said shuffle members concluding an upper article supporting surface and a front article advancing surface, means mounting said sets on the associated frame for relative reciprocating movement in a direction to advance an article from shuffle member to shuffle member, the article advancing face of said shuffle member of one of said shuffle feed mechanisms comprising a transverse series of wedges providing a sawtooth construction to provide a transverse series of article stops to which a corresponding series of cam surfaces lead on each shuffle member, the article advancing face of the shuffle members of the other shuffle member comprising a similar transverse series of wedges providing a sawtooth construction for providing a transverse series of stops to which a corresponding series of oppositely disposed cam surfaces lead, whereby articles fed over each of said shuffle feed mechanisms eventually become positioned with an end against the stop, the article being fed from said first shuffle feed mechanism to said second shuffle feed mechanism having their respective opposite ends disposed against said respective stops.

2. In a feed mechanism as recited in claim 1, a knife mechanism associated with each of said cam surfaces in said first series of shuffle feed members, and a second knife mechanism disposed in cooperation with each of the cam surfaces of said second shuffle feed mechanism, whereby an article is cut into pieces on each of said shuffle feed mechanisms.

3. In a feed mechanism as recited in claim 2, including an article retainer for each article advancing face.

4. In a feed mechanism as recited in claim 3, in which said article retainer comprises a movable member disposed on said frame, and having a free end in the path of an article fed by a shuffle member of the second set.

5. In a feed mechanism as recited in claim 4, including a stop releasing means carried by said shuffle member of said second set for contacting said stop in moving it to an inactive position after an article has been carried through said knives.

6. In a feed mechanism for cutting oriented articles, a support over which articles can be pushed or rolled, a reciprocating member movable with respect to said support to push articles thereacross, a knife positioned to cut an article as it is moved off of said support, yieldable means for holding an article on said support as it is moved into engagement with said knife, a stop for controlling the rest position of said yieldable means and means movable with said reciprocating member to move said yieldable means out of engagement with the article after cutting thereof.

7. In a feed mechanism as recited in claim 6, in which said yieldable holding means comprises a pivoted lever normally held in spaced relation with respect to said support and said reciprocating member.

References Cited

UNITED STATES PATENTS

| 1,727,507 | 9/1929 | Howson | 146—84 |
| 3,291,173 | 12/1966 | Smith et al. | 146—81 R |

WILLIE G. ABERCROMBIE, Primary Examiner

U.S. Cl. X.R.

83—438, 477.2